H. F. JONES.
OIL GAGE.
APPLICATION FILED NOV. 26, 1917.
1,275,935.
Patented Aug. 13, 1918.
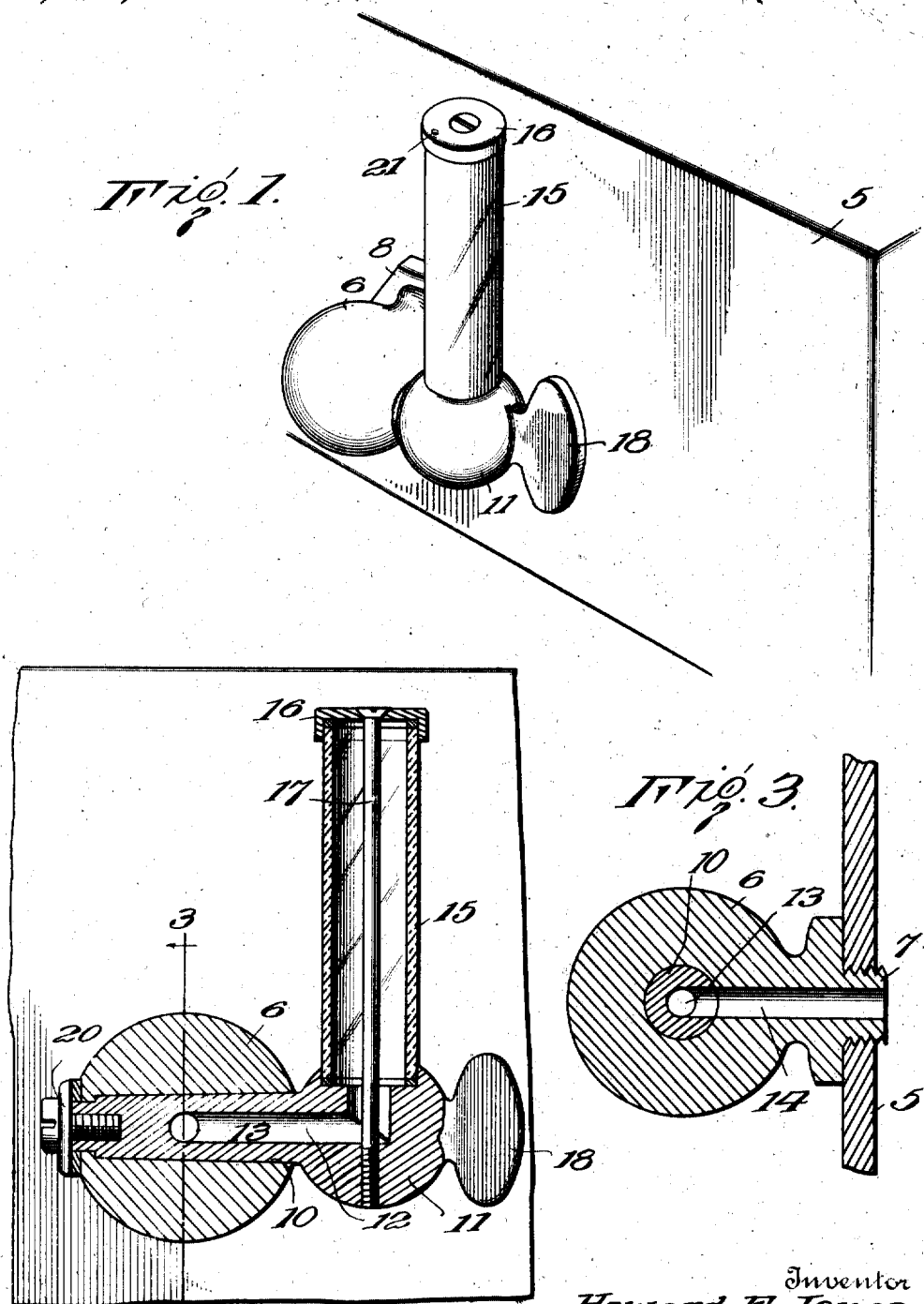
Inventor
Howard F. Jones
By Johnson & Johnson
Attorneys

UNITED STATES PATENT OFFICE.

HOWARD FEILD JONES, OF WARRENTON, NORTH CAROLINA.

OIL-GAGE.

1,275,935.

Specification of Letters Patent.

Patented Aug. 13, 1918.

Application filed November 26, 1917. Serial No. 203,985.

*To all whom it may concern:*

Be it known that I, HOWARD F. JONES, a citizen of the United States, residing at Warrenton, in the county of Warren and State of North Carolina, have invented certain new and useful Improvements in Oil-Gages, of which the following is a specification.

This invention relates to gages and more particularly to gages adapted to indicate the level of a liquid within a receptacle. As herein shown and described the invention is applied to the crank case of an automobile for indicating the level or quantity of oil within the case, although it is, of course, to be understood that it is equally applicable with slight modifications to various other uses.

One of the objects of the present invention is to provide a gage of the above general character having relatively few parts which will be inexpensive to manufacture and install. A further object is to provide a self-contained device which may be easily and quickly applied to the crank cases of automobiles or wherever desired with a minimum amount of trouble. A further object is to provide a device of the above character which may be easily and quickly cleaned and will be less likely to become discolored in use than gages now in general use.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a perspective view showing the device in operative position;

Fig. 2 is a transverse sectional view of the device;

Fig. 3 is a section taken on the line 3—3 of Fig. 2.

Referring now to the drawings in detail, 5 denotes the side wall of a receptacle, preferably the crank case of an automobile into which a member 6 is mounted by means of a threaded nipple 7 and an irregular collar 8 permitting the same to be conveniently turned. This member 6 has a longitudinal bore communicating with the interior of the receptacle 5 and a second bore or transverse opening at right angles thereto adapted to receive a stem 10 of valve member 11. This stem is provided with a longitudinally disposed opening 12 terminating at one end with a transverse opening or portion 13 communicating with passageway 14 in the member 6, as shown more clearly in Fig. 3. The opposite end of the passageway 12 communicates with the interior of a transparent or glass gage member 15 provided at its upper end with a cap 16 and held in place by means of a bolt 17, the head of which engages the cap 16 while its opposite end is threaded into the member 11, as clearly shown in Fig. 2. The member 11 is provided with a handle or operating means 18 whereby the device may be easily turned downwardly from the position shown in Fig. 1. The stem 10 is, of course, held in place in the member 6, by any desired means, such as the threaded nut 20. By reference to Fig. 1 it will be noted that the cap 16 is provided with an outlet opening 21 whereby the tube 15 may be conveniently drained when swung down.

While the construction of the device herein disclosed is believed to be clear from the above description, a brief statement of the operation may enable one to more clearly understand its use. When swung upwardly to the position shown in Figs. 1 or 2, the oil from the interior of the receptacle flows through the passageway 14, passageway 12 and thence up into the glass gage 15 where it will clearly indicate the amount of oil contained within the receptacle. As soon as this has been indicated, the gage is turned downwardly by means of the handle 18 which cuts off the passageway 12 from the outlet 14, thereby preventing further escape of oil and the relatively small amount contained within the gage 15 will be allowed to drain out through the opening 21. In ordinary stationary gages, more or less sediment contained within the oil will adhere to the inside of the glass tube and so discolor the same that it will be impossible to tell the exact height of the oil within the receptacle and it is one of the objects of the present invention to overcome this objection by allowing the oil to drain out of the gage before it has an opportunity to adhere to the interior surface of the gage. It will also be noted that when the gage is swung down, the passages 12 and 14 are disconnected. Taking out the bolt 17 permits the removal of the glass 15 whereby it may be cleaned.

It is thus seen that the present invention provides a simple practical gage of the above general character having relatively few parts which will be cheap to manufacture and install. In short, the invention is believed to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a gage of the character described, in combination, a member having a passage adapted to communicate with the interior of a receptacle, a tubular valve stem communicating with said passage and a gage mounted upon said stem, the interior of which is adapted to communicate through said passages with the interior of said receptacle when said valve member occupies a predetermined position, and means for draining said gage of its contents when turned from said predetermined position.

2. In a gage of the character described, in combination, a member having a passage adapted to communicate with the interior of a receptacle, a tubular valve stem passing through said member and communicating with said passageway, a gage glass removably mounted upon said valve stem and communicating through said tubular valve stem with said passageway when the stem occupies a predetermined position with respect thereto, and a handle for turning said valve stem, said device having means whereby it may be conveniently drained of its contents when moved from said predetermined position.

In testimony whereof I affix my signature in presence of two witnesses.

HOWARD FEILD JONES.

Witnesses:
RICHARD B. BOYD, JR.,
FRANK SERK, JR.